(12) United States Patent
Shin

(10) Patent No.: US 8,803,391 B2
(45) Date of Patent: Aug. 12, 2014

(54) SPINDLE MOTOR

(75) Inventor: Jun Seop Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 32 days.

(21) Appl. No.: 13/301,116

(22) Filed: Nov. 21, 2011

(65) Prior Publication Data

US 2012/0319515 A1    Dec. 20, 2012

(30) Foreign Application Priority Data

Jun. 20, 2011    (KR) .................... 10-2011-0059693

(51) Int. Cl.
*H02K 5/16* (2006.01)
*G11B 33/02* (2006.01)
*F16C 32/06* (2006.01)
*F16C 21/00* (2006.01)

(52) U.S. Cl.
USPC ........... 310/90; 360/99.08; 384/100; 384/102

(58) Field of Classification Search
CPC .......... H02K 5/16; G11B 33/02; F16C 32/06; F16C 21/00
USPC .................... 310/90, 156.12–156.15, 156.26; 384/100, 102; 360/99.08
See application file for complete search history.

(56) References Cited

U.S. PATENT DOCUMENTS

| | | | |
|---|---|---|---|
| 2004/0091187 A1* | 5/2004 | Aiello et al. | 384/112 |
| 2004/0165797 A1 | 8/2004 | Oku et al. | |
| 2004/0223673 A1* | 11/2004 | Tiller et al. | 384/107 |

FOREIGN PATENT DOCUMENTS

| | | |
|---|---|---|
| JP | 2001-56022 | 2/2001 |
| JP | 2002054628 A * | 2/2002 |
| JP | 2004-286145 | 10/2004 |
| JP | 2005291428 A * | 10/2005 |
| JP | 2006-271177 | 10/2006 |
| KR | 2006-0114883 | 11/2006 |
| WO | WO 2006/118407 | 11/2006 |

OTHER PUBLICATIONS

Machine Translation JP2005291428 (2005) and JP2002054628 (2002).*
Machine Translation JP2005291428 (2005).*

* cited by examiner

*Primary Examiner* — Tran Nguyen
*Assistant Examiner* — Jose Gonzalez Quinone

(57) ABSTRACT

There is provided a spindle motor including: a sleeve supporting a shaft; and a rotor hub coupled to an upper portion of the shaft to thereby form a bearing clearance with the sleeve, wherein the sleeve and the rotor hub are provided with a plurality of sealing parts for preventing a leakage of a lubricating fluid.

7 Claims, 5 Drawing Sheets

SPINDLE MOTOR

CROSS-REFERENCE TO RELATED APPLICATIONS

This application claims the priority of Korean Patent Application No. 10-2011-0059693 filed on Jun. 20, 2011, in the Korean Intellectual Property Office, the disclosure of which is incorporated herein by reference.

BACKGROUND OF THE INVENTION

1. Field of the Invention

The present invention relates to a spindle motor, and more particularly, to a spindle motor of which a rotating member is supported by fluid dynamic pressure generated through the filling of a lubricating fluid.

2. Description of the Related Art

A small spindle motor used in a hard disk drive (HDD) is generally provided with a fluid dynamic bearing assembly, and a bearing clearance formed between a shaft and a sleeve of the fluid dynamic bearing assembly is filled with a lubricating fluid such as oil. The oil filling the bearing clearance may generate fluid dynamic pressure while being pumped, thereby rotatably supporting the shaft.

The bearing clearance may be formed by an upper surface of the sleeve and a lower surface of a rotor hub coupled to the shaft to thereby rotate together therewith. In addition, the bearing clearance formed by the upper surface of the sleeve and the lower surface of the rotor hub may be also filled with lubricating fluid.

Meanwhile, when an impact is applied from the outside, the lubricating fluid may be leaked from the bearing clearance, that is, a side at which an interface between the lubricating fluid and air is formed, to the outside of the bearing clearance.

When the lubricating fluid leaked to the outside is scattered, an inner portion of the spindle motor may be contaminated by the lubricating fluid.

In addition, when the lubricating fluid is leaked to the outside, the fluid dynamic pressure generated through the lubricating fluid may be reduced, thereby deteriorating performance of the spindle motor and reducing a lifespan thereof.

SUMMARY OF THE INVENTION

An aspect of the present invention provides a spindle motor capable of reducing a leakage of lubricating fluid.

According to an aspect of the present invention, there is provided a spindle motor including: a sleeve supporting a shaft; and a rotor hub coupled to an upper portion of the shaft to thereby form a bearing clearance with the sleeve, wherein the sleeve and the rotor hub are provided with a plurality of sealing parts for preventing a leakage of a lubricating fluid.

The sealing part may include a first sealing part having a liquid-vapor interface formed in an axial direction and a second sealing part disposed in an outer diameter direction from the first sealing part and having a liquid-vapor interface formed in the outer diameter direction.

The rotor hub may include an extension wall part extended downwardly in the axial direction from a lower surface thereof, and the first and second sealing parts may be formed by the extension wall part and the sleeve.

The sleeve may include a protrusion part protruding in the outer diameter direction so as to be disposed under the extension wall part, and the first sealing part may be formed by an outer peripheral surface of the sleeve disposed above the protrusion part and an inner surface of the extension wall part and the second sealing part may be formed by a lower surface of the extension wall part and an upper surface of the protrusion part.

One of the outer peripheral surface of the sleeve disposed above the protrusion part and the inner surface of the extension wall part may be inclined such that the liquid-vapor interface is formed in the axial direction.

One of the lower surface of the extension wall part and the upper surface of the protrusion part may be inclined such that the liquid-vapor interface is formed in the outer diameter direction.

At least one of the lower surface of the extension wall part and the upper surface of the protrusion part may be provided with an in-pumping groove.

The spindle motor may further include a base member including a sleeve housing having the sleeve fixedly mounted therein, wherein the sleeve housing includes an outer wall part extended so as to be disposed in the outer diameter direction from the extension wall part.

The outer wall part and the protrusion part may be spaced apart from each other by a predetermined interval such that the lubricating fluid leaked at the time of an external impact is stored therebetween.

The sleeve may include a small diameter part having the rotor hub mounted thereon and a large diameter part connected to the small diameter part and having a diameter larger than the small diameter part, and the first sealing part may be formed by an outer peripheral surface of the small diameter part and an inner peripheral surface of the extension wall part, and the second sealing part may be formed by a lower surface of the extension wall part and an upper surface of the large diameter part.

One of the outer peripheral surface of the small diameter part and the inner peripheral surface of the extension wall part may be inclined such that the liquid-vapor interface is formed in the axial direction.

One of the lower surface of the extension wall part and the upper surface of the large diameter part may be inclined such that the liquid-vapor interface is formed in the outer diameter direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 1:
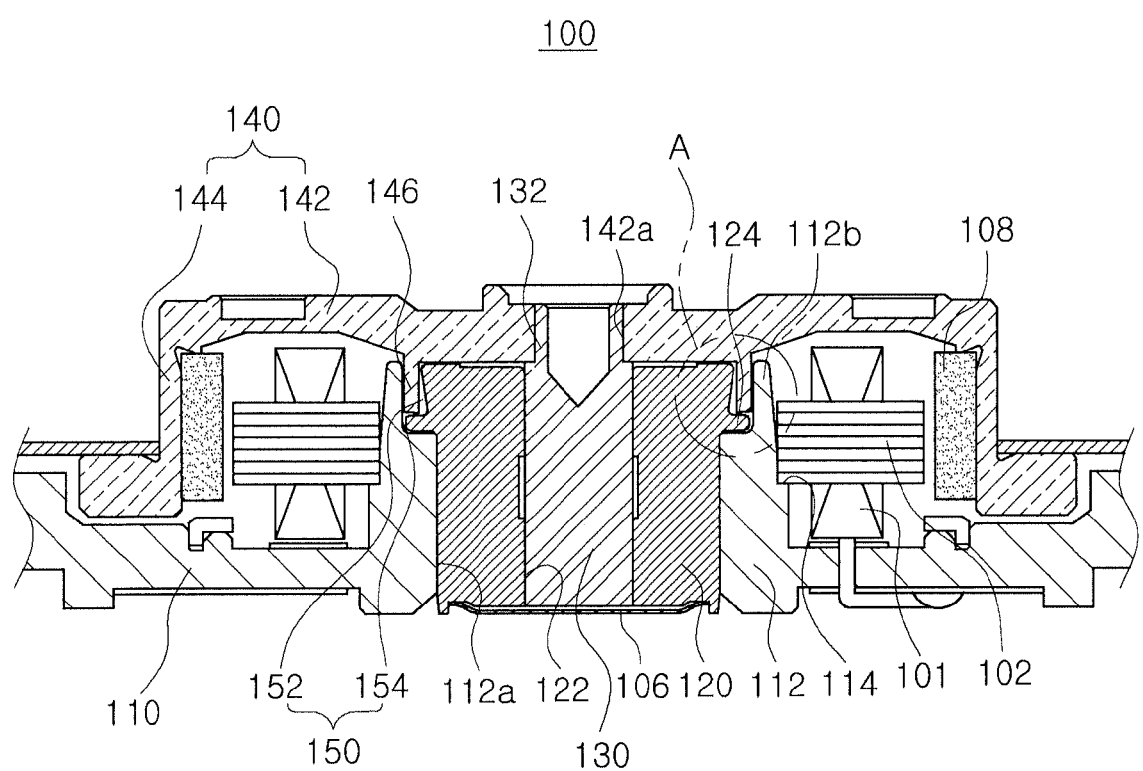
FIG. 1 is a cross-sectional view schematically showing a spindle motor according to an embodiment of the present invention.
Figure 2:
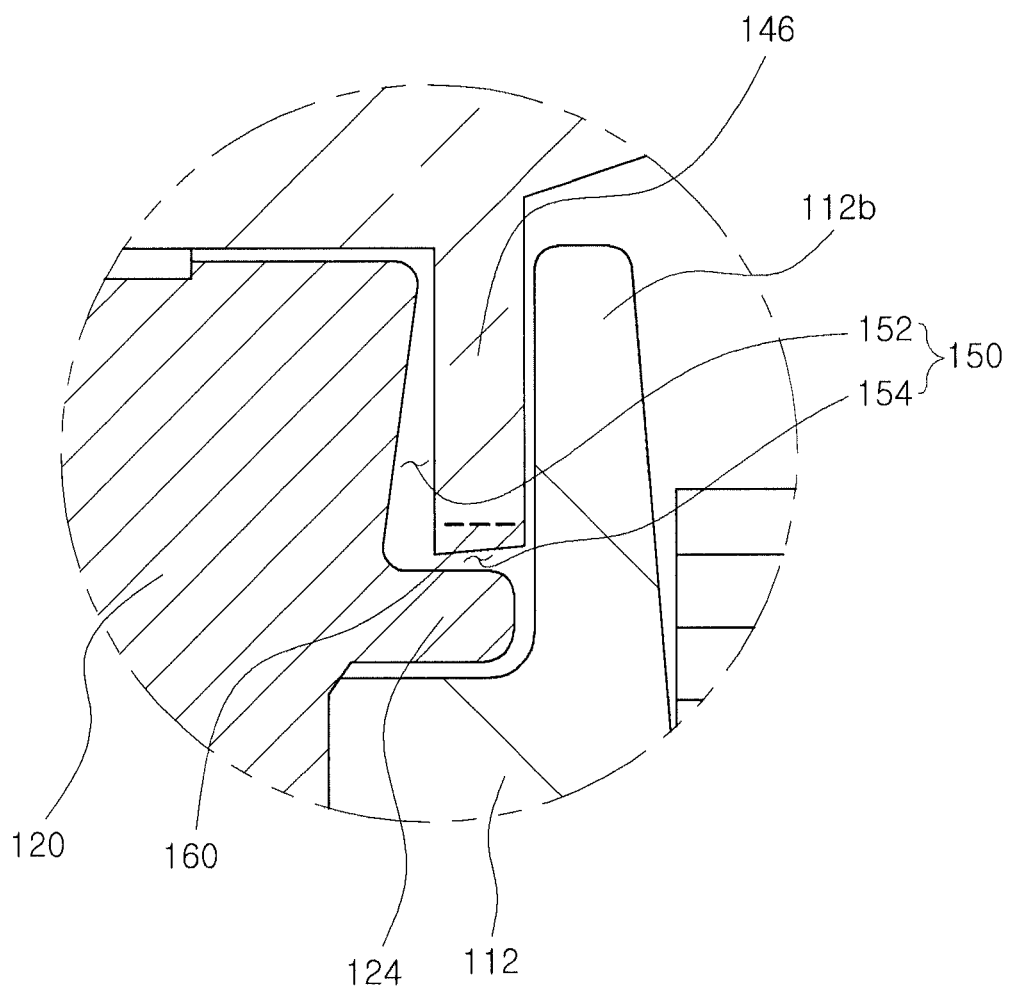
FIG. 2 is an enlarged view of part A of FIG. 1.

FIG. 1 is a cross-sectional view schematically showing a spindle motor according to an embodiment of the present invention, and FIG. 2 is an enlarged view showing part A of FIG. 1.

Referring to FIGS. 1 and 2, a spindle motor 100 according to an embodiment of the present invention may include, for example, a base member 110, a sleeve 120, a shaft 130, and a rotor hub 140.

Meanwhile, terms with respect to directions will be defined. As viewed in FIG. 1, an axial direction refers to a vertical direction based on the shaft 130, an outer or inner diameter direction refers to a direction from the shaft 130 toward an outer peripheral surface of the rotor hub 140 or a direction toward the shaft 130 based on the outer peripheral surface of the rotor hub 140, and a circumferential direction refers to a rotation direction along the outer peripheral surface of the shaft 130.

The base member 110 may include a sleeve housing 112 having the sleeve 120 fixedly mounted therein. That is, the base member 110 may include the sleeve housing 112 protruding upwardly in the axial direction, and the sleeve housing 112 may form a mounting hole 112a into which the sleeve 120 is inserted.

In addition, an outer peripheral surface of the sleeve 120 and an inner peripheral surface of the sleeve housing 112 may be adhered to each other by an adhesive, such that the sleeve 120 may be fixedly mounted in the sleeve housing 112.

Meanwhile, the sleeve housing 112 may include a stator core 102 mounted on an outer peripheral surface thereof, the stator core 102 having a coil 101 wound therearound. To this end, the sleeve housing 112 may include a step part 114 formed on the outer peripheral surface thereof, the step part 114 having the stator core 102 seated thereon. In addition, the stator core 102 may be fixedly mounted on the sleeve housing 122 by an adhesive and/or welding in a state in which stator core 102 is seated on the step part 114.

The sleeve 120 may rotatably support the shaft 130. Meanwhile, as described above, the sleeve 120 may be fixedly mounted in the sleeve housing 112.

Further, the sleeve 120 may include a shaft hole 122 formed therein, the shaft hole 122 having the shaft 130 inserted thereinto. That is, the shaft 130 may be insertedly mounted into the shaft hole 122 of the sleeve 120.

Meanwhile, in a case in which the shaft 130 is mounted into the sleeve 120, an inner peripheral surface of the sleeve 120 and the outer peripheral surface of the shaft 130 may be disposed to be spaced apart from each other by a predetermined interval to thereby form a bearing clearance therebetween. The bearing clearance may be filled with a lubricating fluid, and the shaft 130 may be more stably supported by dynamic pressure generated through the lubricating fluid at the time of rotation thereof.

In addition, the sleeve 120 may include a protrusion part 124 protruding in the outer diameter direction. The protrusion part 124 may be formed at an upper portion of the outer circumferential surface of the sleeve 120.

A detailed description of the protrusion part 124 will be provided below.

Meanwhile, the sleeve 120 may include a cover member 106 mounted on a lower portion thereof in order to prevent the filled lubricating fluid from being leaked through the lower portion thereof. That is, an upper portion of the cover member 106 may be filled with the lubricating fluid. In addition, although not shown, a dynamic pressure groove for generating thrust fluid dynamic pressure may be formed in an upper surface of the cover member 106.

The shaft 130 may be mounted in the sleeve 120, and may have a cylindrical shape. In addition, the shaft 130 may include a mounting part 132 formed at an upper portion thereof, the mounting part 132 having a small diameter and including the rotor hub 140 coupled thereto.

The rotor hub 140 may be coupled to the upper portion of the shaft 130 to thereby form a bearing clearance with the sleeve 120. In addition, the rotor hub 140 may include a body 142 having an mounting hole 142a formed therein, the mounting hole 142a allowing the rotor hub 140 to be mounted in the shaft 130, and a magnet mounting part 144 extended downwardly in the axial direction from an edge of the body 142.

In addition, the magnet mounting part 144 may include an annular ring shaped magnet 108 mounted on an inner peripheral surface thereof. Meanwhile, the magnet 108 may be a permanent magnet generating magnetic force having a predetermined strength by alternately magnetizing an N pole and an S pole thereof in the circumferential direction.

In addition, a leading edge of the stator core 102 mounted in the sleeve housing 112 may be disposed to face the magnet 108. Further, when power is applied to the coil 101 wound around the stator core 102, the rotor hub 140 may rotate by electromagnetic interaction between the stator core 102 having the coil 101 wound therearound and the magnet 108.

In other words, the rotor hub 140 may rotate through electromagnetic interaction between the magnet 108 and the stator core 102 having the coil 101 wound therearound, and the shaft 130 may rotate together with the rotor hub 140.

In addition, the body 142 may be coupled to the mounting part 132 of the shaft 130 such that a lower surface of the body 142 and an upper surface of the sleeve 120 are spaced apart from each other by a predetermined interval. That is, the lower surface of the body 142 and the upper surface of the sleeve 120 may include a bearing clearance formed therebetween, the bearing clearance being filled with a lubricating fluid.

In addition, the rotor hub 140 and the sleeve 120 may be provided with a plurality of sealing parts 150 for preventing leakage of the lubricating fluid. In addition, the sealing parts 150 may include a first sealing part 152 having a liquid-vapor interface formed in the axial direction and a second sealing part 154 disposed in the outer diameter direction from the first sealing part 152 and having a liquid-vapor interface formed in the outer diameter direction.

That is, the rotor hub 140 may include an extension wall part 146 extended downwardly in the axial direction from a lower surface thereof, and the first and second sealing parts 152 and 154 may be formed by the extension wall part 146 and the sleeve 120.

More specifically, the first sealing part 152 may be formed by the outer peripheral surface of the sleeve 120 disposed above the protrusion part 124 of the sleeve 120 and an inner surface of the extension wall part 146.

In addition, one of the outer peripheral surface of the sleeve 120 disposed above the protrusion part 124 and the inner surface of the extension wall part 145 may be inclined such that a liquid-vapor interface (that is, an interface between the lubricating fluid and air) may be formed in the axial direction.

In other words, in the first sealing part 152 formed by the outer peripheral surface of the sleeve 120 and the inner surface of the extension wall part 146, an upper portion thereof has a longitudinal section dimension smaller than that of a lower portion thereof.

Meanwhile, although FIGS. 1 and 2 show a case in which the outer peripheral surface of the fixedly mounted sleeve 120 is inclined, the present invention is not limited thereto.

In addition, the second sealing part 154 may be formed by a lower surface of the extension wall part 146 and an upper surface of the protrusion part 124. In addition, one of the lower surface of the extension wall part 146 and the upper surface of the protrusion part 124 may be inclined such that the liquid-vapor interface (that is, the interface between the lubricating fluid and air) may be formed in the outer diameter direction.

Meanwhile, although FIGS. 1 and 2 exemplarily show a case in which the lower surface of the extension wall part 146 is inclined, the present invention is not limited thereto.

In addition, at least one of the lower surface of the extension wall part 146 and the upper surface of the protrusion part 124 may be provided with an in-pumping groove 160. That is, pumping force may be generated in the inner diameter direction by air dynamic pressure generated by the in-pumping groove 160 at the time of rotation of the rotor hub 140.

In addition, the sleeve housing 112 may have an outer wall part 112b disposed to face the protrusion part 124 of the sleeve 120 at the time of a coupling of the sleeve 120 thereto. In addition, the outer wall part 112b of the sleeve housing 112 and a side of the protrusion part 124 may be disposed to be spaced apart from each other by a predetermined interval at the time of coupling between the sleeve 120 and the sleeve housing 112. Therefore, when an impact is applied from the outside, the lubricating fluid leaked from the first and second sealing parts 152 and 154 may be stored in a space formed by the outer wall part 112b and the protrusion part 124 without being leaked to the outside (that is, to a space in which the stator core 102 is disposed).

As described above, even in the case that an impact is applied from the outside, the leakage of the lubricating fluid to the outside may be reduced through the sealing parts 150 including the first and second sealing parts 152 and 154. That is, even in the case that an impact is applied from the outside, the lubricating fluid moves to form an interface with the air in the second sealing part 154, whereby leakage of the lubricating fluid to the outside may be reduced.

Hereinafter, an operation of a spindle motor according to an embodiment of the present invention will be described with reference to the accompanying drawings.

Figure 3:
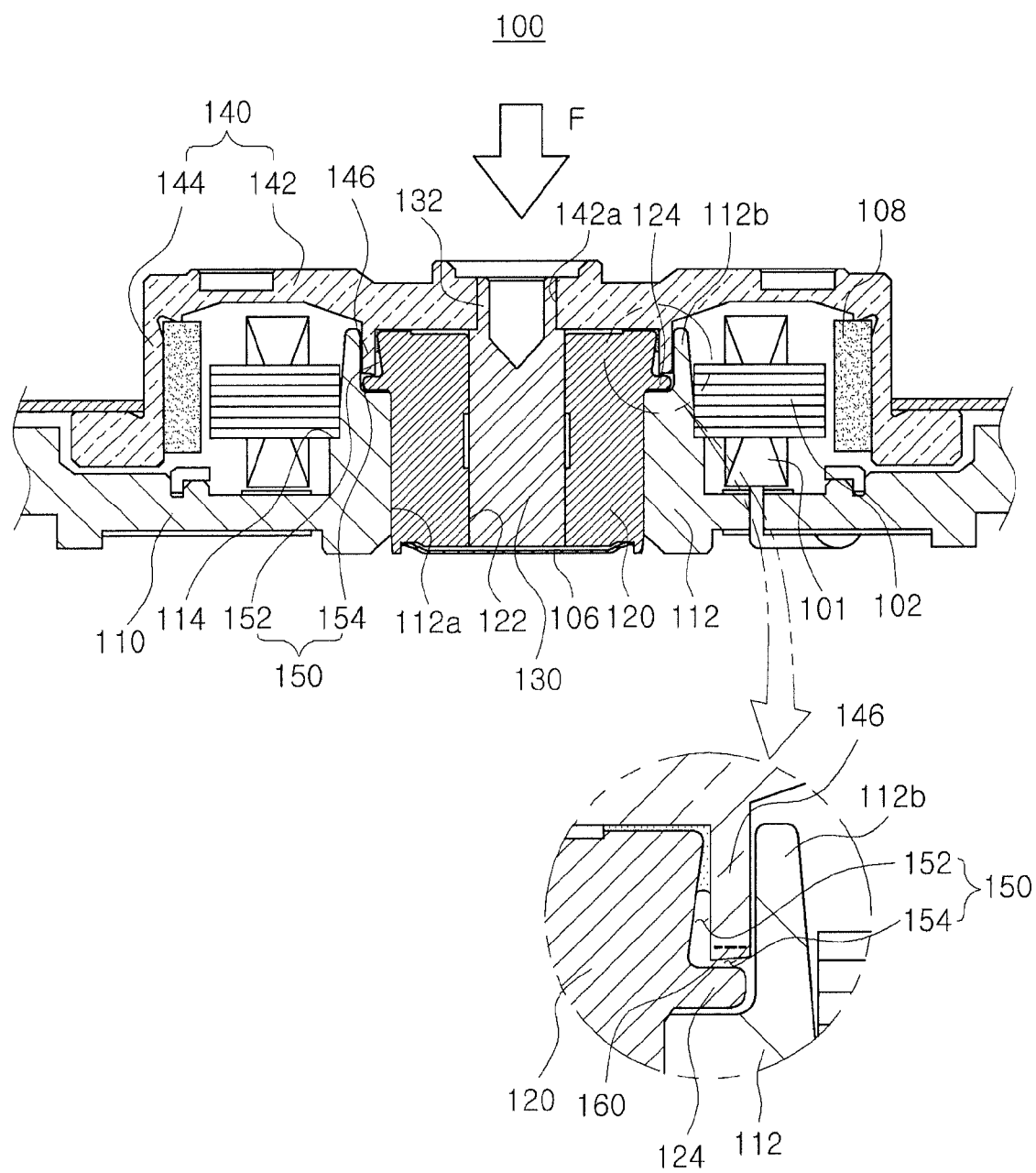
FIGS. 3 and 4 are views describing an operation of a spindle motor according to an embodiment of the present invention.
Figure 4:
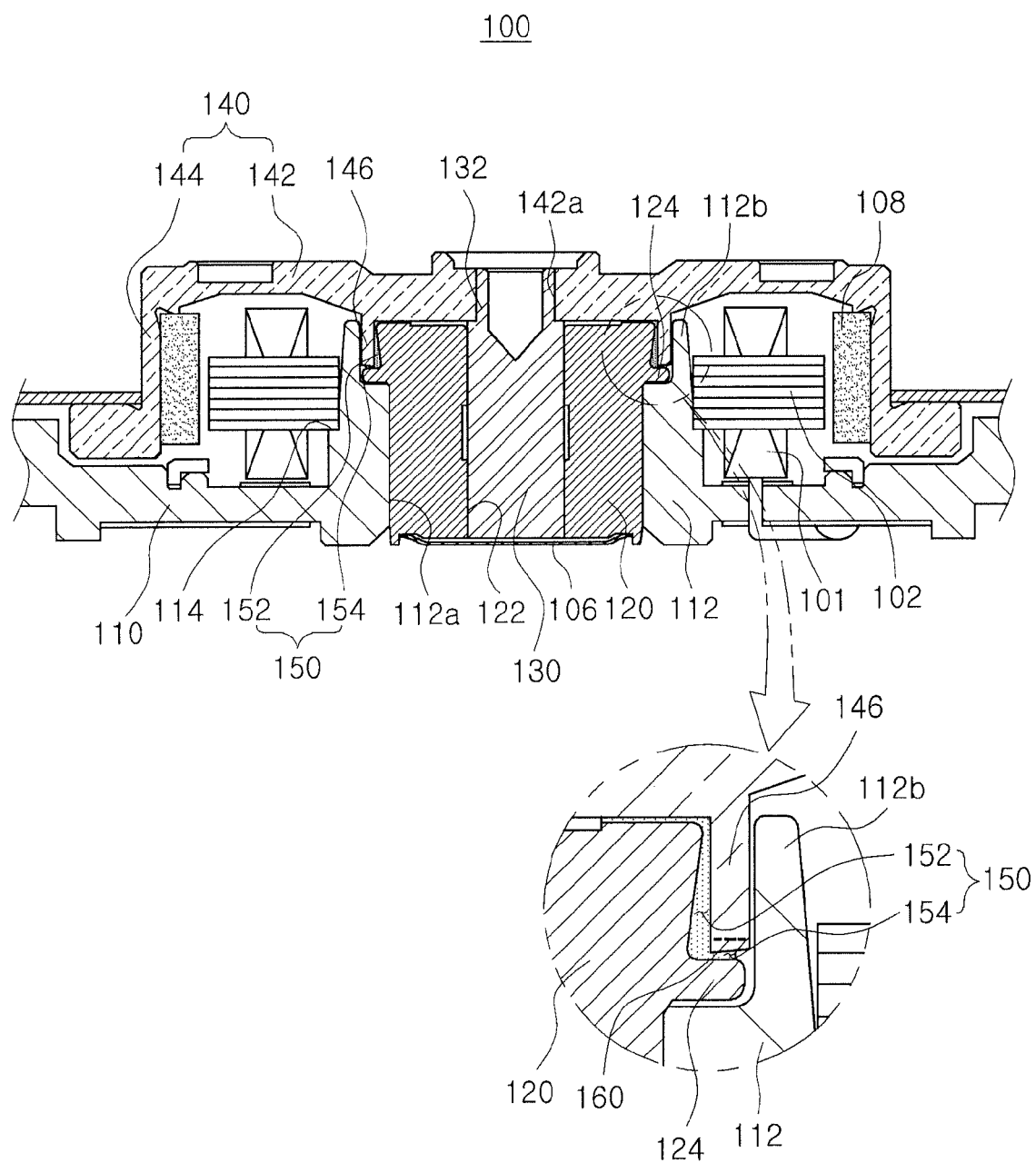

FIGS. 3 and 4 are views describing an operation of a spindle motor according to an embodiment of the present invention.

Referring to FIG. 3, first, when the spindle motor 100 is normally driven, an interface between the lubricating fluid filling the bearing clearance and air may be formed in the first sealing part 152. In this state, when an impact F ("external impact") is applied from the outside, the shaft 130 may be floated due to the external impact and then returns to its original position.

Therefore, the shaft 130 may push the lubricating fluid filling the bearing clearance from the bearing clearance to the outside.

That is, as shown in FIG. 4, the lubricating fluid is leaked from the first sealing part 152 to move toward the second sealing part 154. However, the second sealing part 154 may be formed on a movement path of the lubricating fluid, such that the interface between the lubricating fluid and the air may be formed in the second sealing part 154. That is, the interface between the lubricating fluid and the air may be formed in the second sealing part 154 at the time of the external impact, whereby the leakage of the lubricating fluid to the outside may be reduced.

Furthermore, even in the case that the lubricating fluid is leaked from the second sealing part 154 due to the external impact, the lubricating fluid may be stored in the space formed by the outer wall part 112b of the sleeve housing 112 and the protrusion part 124, whereby the leakage of the lubricating fluid to the outside may be further reduced. That is, the leakage of the lubricating fluid to the space in which the stator core 102 is disposed may be reduced.

Then, when the spindle motor 100 is normally driven, the lubricating fluid is again introduced into the bearing clearance as shown in FIG. 3, and the interface between the lubricating fluid and the air may be formed in the first sealing part 152.

Hereinafter, a spindle motor according to another embodiment of the present invention will be described with reference to the accompanying drawings. However, a detailed description of the same components as the above-mentioned components will be replaced by the above description and be omitted below.

Figure 5:
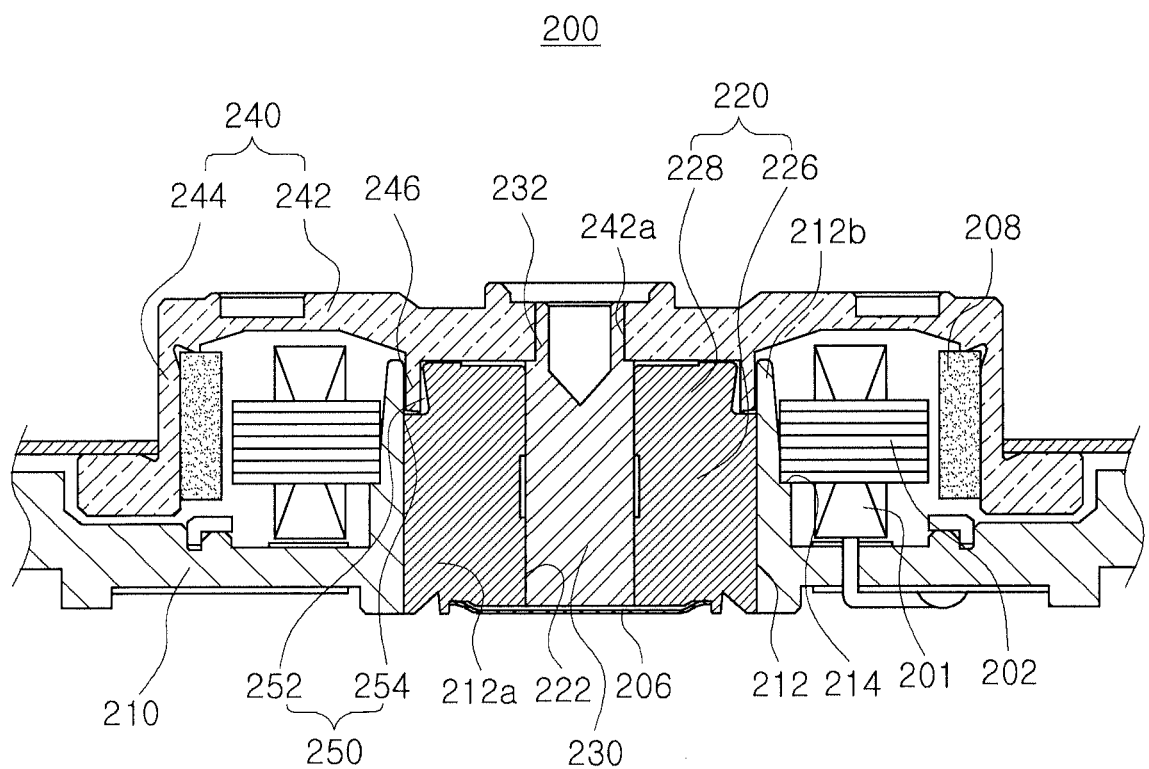
FIG. 5 is a cross-sectional view schematically showing a spindle motor according to another embodiment of the present invention.

FIG. 5 is a cross-sectional view schematically showing a spindle motor according to another embodiment of the present invention.

Referring to FIG. 5, a spindle motor 200 according to another embodiment of the present invention may include a base member 210, a sleeve 220, a shaft 230, and a rotor hub 240.

Meanwhile, the shaft 230 and the rotor hub 240 included in a spindle motor 200 according to another embodiment of the present invention have the same configuration as the shaft 130 and the rotor hub 140 included in the spindle motor 100 according to the foregoing embodiment of the present invention. Therefore, a detailed description thereof will be omitted.

The base member 210 is almost the same as the base member 110 included in the spindle motor 100 according to the embodiment of the present invention and is different only in terms of a thickness of a sleeve housing 212 from the base member 110.

The sleeve 220 may rotatably support the shaft 230. Meanwhile, the sleeve 220 may be fixedly mounted in the sleeve housing 212 and may include a shaft hole 222 formed therein, the shaft hole 222 having the shaft 230 inserted thereinto.

Meanwhile, in a case in which the shaft 230 is mounted in the sleeve 220, an inner peripheral surface of the sleeve 220 and the outer peripheral surface of the shaft 230 may be disposed to be spaced apart from each other by a predetermined interval to thereby form a bearing clearance therebetween. The bearing clearance may be filled with lubricating fluid, and the shaft 230 may be more stably supported by dynamic pressure generated through the lubricating fluid at the time of rotation thereof.

In addition, the sleeve 220 may include a large diameter part 226 of which an outer peripheral surface is adhered to the sleeve housing 212 and a small diameter part 228 disposed at an upper portion of the large diameter part 226 and forming a bearing clearance with the rotor hub 240.

In addition, the rotor hub 240 and the sleeve 220 may be provided with a plurality of sealing parts 250 for preventing leakage of the lubricating fluid. In addition, the sealing parts 250 may include a first sealing part 252 having a liquid-vapor interface formed in the axial direction and a second sealing part 254 disposed in the outer diameter direction from the first sealing part 252 and having a liquid-vapor interface formed in the outer diameter direction.

Further, the rotor hub 240 may include an extension wall part 246 extended downwardly in the axial direction from a lower surface thereof, and the first and second sealing parts 252 and 254 may be formed by the extension wall part 246 and the sleeve 220.

More specifically, the first sealing part 252 may be formed by an outer peripheral surface of the small diameter part 228 and an inner peripheral surface of the extension wall part 246. In addition, one of the outer peripheral surface of the small diameter part 228 and the inner peripheral surface of the extension wall part 246 may be inclined such that the liquid-vapor interface may be formed in the axial direction.

Meanwhile, the second sealing part 254 may be formed by a lower surface of the extension wall part 246 and an upper surface of the large diameter part 226. In addition, one of the lower surface of the extension wall part 246 and the upper surface of the large diameter part 226 may be inclined such that the liquid-vapor interface may be formed in the outer diameter direction.

In addition, at least one of the lower surface of the extension wall part 246 and the upper surface of the large diameter part 226 may be provided with an in-pumping groove 260. That is, pumping force may be generated in the inner diameter direction by air dynamic pressure generated by the in-pumping groove 260 at the time of rotation of the rotor hub 240.

As described above, even in the case that an impact is applied from the outside, so that the lubricating fluid is leaked from the first sealing part 252, the second sealing part 254 may be positioned on a movement path of the lubricating fluid, whereby an interface between the lubricating fluid and air may be formed in the second sealing part 254. Therefore, the leakage of the lubricating fluid may be further reduced.

As set forth above, according to the embodiment of the present invention, even in the case that an external impact is applied, the leakage of the lubricating fluid may be reduced through the first and second sealing parts. That is, even in the case that the lubricating fluid is leaked from the first sealing part due to an external impact, the leakage of the lubricating fluid may be reduced through the second sealing part, whereby the leakage of the lubricating fluid may be more surely reduced.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a sleeve supporting a shaft; and
a rotor hub coupled to an upper portion of the shaft to thereby form a bearing clearance with the sleeve, the rotor hub including an extension wall part extended downwardly in the axial direction from a lower surface thereof,
wherein the sleeve includes a protrusion part protruding in the outer diameter direction so as to be disposed under the extension wall part, and
the sleeve and the rotor hub are provided with a plurality of sequentially disposed sealing parts for preventing a leakage of a lubricating fluid, the plurality of sealing parts including
a first sealing part formed by an outer peripheral surface of the sleeve disposed above the protrusion part and an inner surface of the extension wall part, and
a second sealing part formed by a lower surface of the extension wall part and an upper surface of the protrusion part.

2. The spindle motor of claim 1, wherein one of the outer peripheral surface of the sleeve disposed above the protrusion part and the inner surface of the extension wall part is inclined such that a liquid-vapor interface is formed in the axial direction.

3. The spindle motor of claim 1, wherein one of the lower surface of the extension wall part and the upper surface of the protrusion part is inclined such that a liquid-vapor interface is formed in the outer diameter direction.

4. The spindle motor of claim 1, wherein at least one of the lower surface of the extension wall part and the upper surface of the protrusion part is provided with an in-pumping groove.

5. The spindle motor of claim 1, further comprising a base member including a sleeve housing having the sleeve fixedly mounted therein,
wherein the sleeve housing includes an outer wall part extended so as to be disposed in the outer diameter direction from the extension wall part.

6. The spindle motor of claim 5, wherein the outer wall part and the protrusion part are spaced apart from each other by a predetermined interval such that the lubricating fluid leaked at the time of an external impact is stored therebetween.

7. The spindle motor of claim 1, wherein
the first sealing part is formed by two surfaces interposing a first gap that is widened along the axial direction, and
the second sealing part is formed by two surfaces interposing a second gap that is, along the outer diameter direction, widened from an initial width that is narrower than a width of an end portion of the first gap proximate to the second gap.

* * * * *